June 13, 1939.  R. S. BLODGETT  2,161,847
SYSTEM FOR CONTROL OF DISCONTINUOUS PROCESSES
Filed Dec. 28, 1937  2 Sheets-Sheet 2
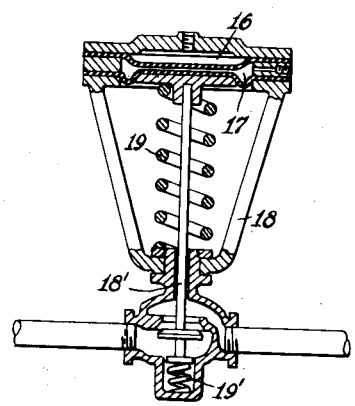
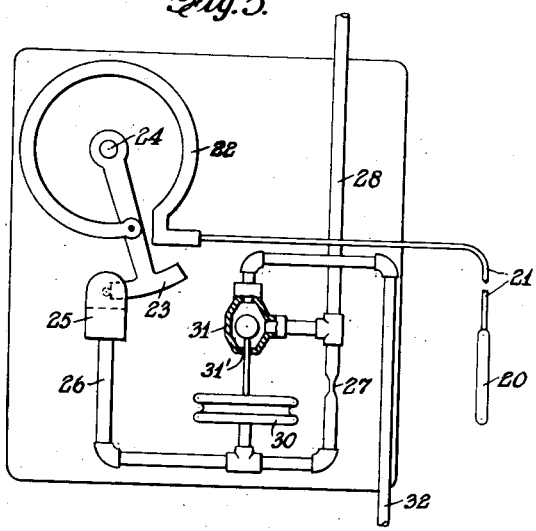
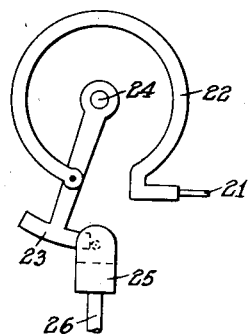
INVENTOR.
RAYMOND S. BLODGETT
BY
THEIR ATTORNEY.

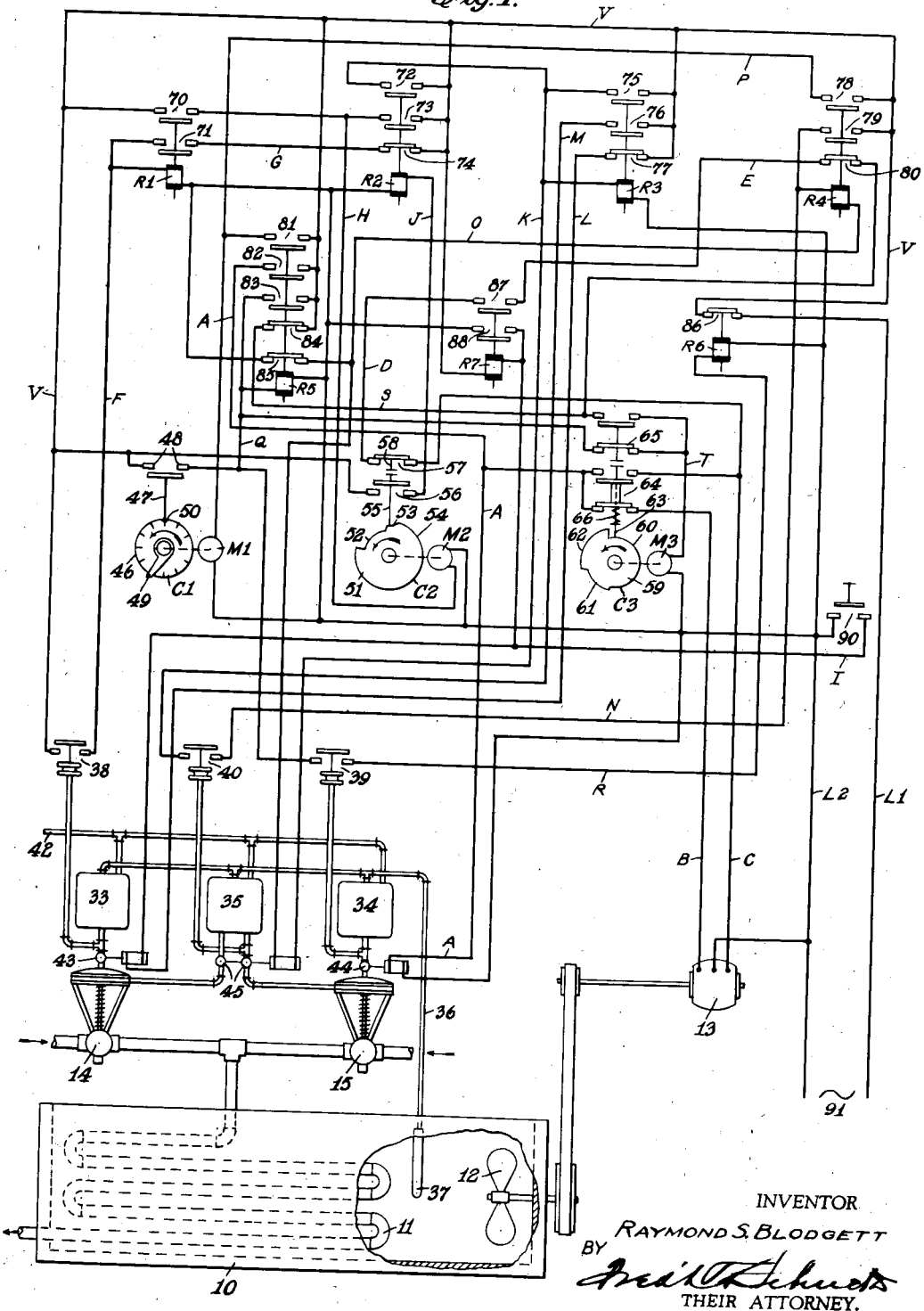

Patented June 13, 1939

2,161,847

UNITED STATES PATENT OFFICE 2,161,847

SYSTEM FOR CONTROL OF DISCONTINUOUS PROCESSES

Raymond S. Blodgett, East Orange, N. J., assignor to The Bristol Company, Waterbury, Conn., a corporation of Connecticut Application December 28, 1937, Serial No. 182,132

10 Claims. (Cl. 257—2)

This invention relates to automatic process control systems, and more especially to a system wherein a liquid is required to tbe subjected to a succession of different temperatures maintained for predetermined time intervals, alternating with periods of mechanical agitation.

In certain dairy processes, such as the preparation of cultured milk, it has been found desirable to maintain the milk being treated at a relatively high temperature for a definite time period, afterward reducing the temperature to a lower value which is held for a relatively long interval, and then reducing the temperature still further to a value where bacterial action ceases, the intervals of changing temperature being characterized by more or less active mechanical agitation of the milk.

It is an object of this invention to provide means whereby the several events characterizing such a cycle of operations may be automatically carried out in correct sequence and with precision of timing.

In carrying out the invention, motor-driven timing mechanisms are provided for establishing in correct sequence the desired time intervals of a cycle of operations, and regulating means for establishing and maintaining within predetermined time intervals the temperature values, together with fluid-pressure-actuated control means operated by the said regulating means through fluid-pressure connections therebetween, there being provided also means associated with the connections and operable upon the attainment of predetermined pressure conditions in said connections to render active the said timing means. An agitating means is provided, furthermore, which is subject jointly to certain of the timing mechanisms and the said regulating means for rendering the agitating means operative.

The nature of the invention, however, will best be understood when described in connection with the accompanying drawings, in which:

Fig. 1 is a diagrammatic representation of an electro-pneumatic control system embodying the principles of the invention.

Fig. 2 is a sectional view of a double-diaphragm, reverse-acting and pneumatically-operated control valve of a type applicable to use in the system.

Fig. 3 is a view, partly in section, of a pneumatic regulator adapted for use in such a system.

Fig. 4 shows a detail of an alternative arrangement of said regulator.

Referring to the drawings, 10 designates a tank or vat adapted to contain milk or the like for the purpose of being subjected to treatment as hereinbefore set forth, and having therein a coil of tubing 11 in which may be circulated a heating or a cooling liquid to affect the temperature of the milk. Within the tank, and immersed in the liquid under treatment, is an agitator 12 adapted to be driven at either of two predetermined speeds by a motor 13 which to this end may be provided with a high-speed and a low-speed winding (not shown) or equivalent means by which the speeds may be selectively obtained in accordance with external electrical connections.

Control of the temperature of the liquid under treatment is effected by circulating in the coil 11 hot or cold water or a mixture of the two, hot water being controlled by a regulating valve 14 and cold water by a similar valve 15. For the purposes of the invention, these regulating valves may be considered as of the reverse-acting double-diaphragm type, as shown in Fig. 2, having two independent non-communicating diaphragm chambers 16 and 17, either of which may be made operative to actuate the valve mechanism independently of the other. The valve body 18 is of the type wherein motion of the valve stem 18' in response to the admission of air to either diaphragm chamber 16 or 17 tends to open the valve against the influence of springs 19 and 19', the amount of opening being substantially proportional to the air pressure in the operative diaphragm chamber.

Regulation of air pressure within the diaphragm chambers of the said valve for purposes of controlling the flow of a heat-bearing agent, and thereby maintaining at a predetermined temperature the liquid under treatment, is effected by a pneumatic control instrument or regulator, preferably of the class set forth in U. S. Letters Patent #1,880,247, granted to Griggs and Mabey October 4, 1932. The operating principle of this type of regulator will be understood by reference to Fig. 3, which is a diagrammatic representation of one form which the instrument may take. A temperature-sensitive bulb 20, adapted to be exposed to the temperature to be regulated and containing an expansible or volatile fluid, acts through a capillary tube 21 to actuate a Bourdon spring 22 fixed at one end, and through its free extremity acting to rotate a vane 23 through a limited angle about an axis 24 in response to temperature changes, so that the position of the vane becomes at all times a measure of the temperature to which the bulb 20 is exposed. The vane 23 moves freely between opposed jets directed from an orifice member 25, constituting therewith a control couple whereby may be governed the escape of compressed air from a conduit 26 communicating with the orifice member and connected through a constricted portion 27 to a conduit 28 in communication with a supply of air (not shown) and maintained at a pressure of, say, 15 pounds per square inch. In communication with the conduit 26 and located between the orifice member 25 and the constricted portion 27 is an expansible bellows member 30 adapted to actuate a pilot valve 31 of the supply-and-waste type and connected with the conduit 26 in advance of the said constricted portion 27 as well as to a conduit 32 leading to the diaphragm chamber of the particular valve under control.

The relation of said pilot valve, conduits and bellows is such that upon a rise in temperature of the bulb 20 the consequent expansion of the Bourdon spring 22 will move the vane 23 into closer association with the orifice member 25, checking the escape of air therefrom, building up a back-pressure in the conduit 26 and bellows 30. This effects a slight closing off of the supply of air from the conduit 28 to the conduit 32 and a corresponding opening of the vent 31' from the conduit 32 to the atmosphere, whereby the pressure in conduit 32 is lowered as the temperature to which the bulb is exposed rises. Thus, if the conduit 32 be connected to a reverse-acting valve of the type shown in Fig. 2, and this valve be made to control the flow of a heating agent to the medium in which the bulb 20 is immersed, there will be effected an automatic control of the temperature of said medium to a value which may be preestablished by the adjusted relative setting of the orifice member 25 and the vane 23. If it be required similarly to control a temperature by regulation of the flow of a cooling agent, the relative setting of the vane and orifice member may be made, as indicated in Fig. 4, such that upon an increase in temperature to be controlled, the vane will tend to recede from its orifice member, thereby causing the pressure in the control conduit to be increased and effecting opening of the corresponding reverse-acting valve.

Moreover, should it be required to control a temperature which may be either above or below atmospheric, and therefore may require either a heating or a cooling agent, there may be incorporated in a single regulating instrument control units of both the types set forth above, controlling the flow of a heating and a cooling agent respectively, these agents, if necessary, being mixed in suitable proportion and caused to circulate in the heat-exchanging coil 11.

Referring again to Fig. 1, a regulator 33 of the first of the types above set forth is placed in operative association with the upper diaphragm chamber of the hot water valve 14, and adjusted to a control value of (for example) 190° F. A similar regulator 34 of the second of the types above set forth (see Fig. 4) is placed in operative association with the upper diaphragm chamber of the cold water valve 15, and adjusted to a control value of (for example) 45° F. A third regulator 35, embodying each of the two types of control units as set forth above, has these units placed in operative communication with the lower diaphragm chamber of each of the two valves, whereby, as hereinabove set forth, there may be effected a control of temperature to a value either above or below atmospheric. The three control instruments may be actuated by individual temperature-sensitive elements, or, as shown in Fig. 1, they may be connected by means of a capillary tube 36 to a common bulb 37 suitably placed in the tank 10, whereby the Bourdon springs in the several regulators will be actuated in unison with variations of temperature of the material within the tank.

To the air conduits leading from the respective regulators to their associated diaphragm valves are connected three pressure-operated switches 38, 39 and 40, respectively, adapted normally to maintain their contacts in a closed condition, opening them only when air pressures in the associated conduits are in excess of predetermined minimum values and of sufficient magnitude to place the diaphragm valves under definite active control.

The three regulating instruments receive a supply of compressed air from a common source (not shown) through a conduit 42. Interposed in the air lines between the regulators and the diaphragm valves 14 and 15, and in such relationship that the admission of air to the pressure switches is not interrupted thereby, are solenoid valves 43, 44 and 45, associated respectively with regulators 33, 34 and 35, and adapted to be opened upon energization of their respective operating coils, thus placing respective regulators in operative communication with the diaphragm valves to be controlled thereby.

Determination of the various time intervals involved in the process under control is effected by three motor-driven timers C1, C2 and C3, each driven by a constant-speed electric motor M1, M2 and M3, and serving to actuate electrical contactors in the following manner:

Timer C1 carries a cam member 46 having a graduated face and adapted to make one revolution in a period of 15 hours. The single follower 47 of this cam serves to actuate a pair of contacts 48, these being normally open and momentarily closed when engaged by an arm 49 carried by, and angularly adjustable about, the cam member 46. The cam member 46 has on its periphery a notch 50 serving as a point of reference and as a datum line for the graduations, so that the adjusted position of the arm 49 in reference to said graduations becomes a measure of the time which will elapse between the passage of the notch by the follower and the actuation of the follower by the arm.

Timer C2 carries a cam member 51 having peripheral portions 52, 53 and 54 of progressively increasing radius, adapted to be engaged by a single follower 55, whereby the same may be maintained at any one of three distinct levels. Associated with the follower 55 are two pairs of electrical contacts 56 and 57, the former being closed by action of the follower when in engagement with the peripheral portion 52 of the cam member 51 and opened when the follower is in engagement with either of the portions 53 and 54 thereof. Contacts 57 are normally closed by member 58 adapted to be engaged by the follower 55 in a sense to open said contacts only when said follower is in engagement with the peripheral portion 54 having the maximum radius of the cam member 51.

Timer C3 carries a cam member 59 having peripheral portions 60, 61 and 62 of progressively increasing radius, adapted to be engaged by a follower 63 whereby the same may be maintained at any one of three distinct levels. Associated with follower 63 are two contactors 64 and 65 of the single-pole double-throw class, each having upper and lower contacts and so disposed that with the follower in engagement with portion 60 having minimum radius, the lower contacts of both contactors are closed and the upper contacts opened. With the follower 63 in engagement with the cam portion 61 of intermediate radius the said follower, acting through a spring member 66, will cause the contactor 64 to open its lower and close its upper contacts, but will not actuate the contactor 65. With the follower 64 in engagement with the cam portion 62 of maximum radius, the contactor 65 will be engaged and actuated in a sense to open its lower and close its upper contacts, the spring member 66 yielding so that the contactor 64 is not strained by the excessive motion of the follower 63.

Interconnection and interlocking of the several control devices and associated electrical circuits is effected by seven relays, R1, R2, R3, R4, R5, R6, and R7, each having an operating solenoid and having contact arrangements as follows: Relay R1 has two sets of normally open contacts 70 and 71; and relays R2, R3 and R4 have each two sets of normally open contacts and one set of normally closed contacts, these being designated respectively 72, 73, and 74; 75, 76, and 77; and 78, 79, and 80. Relay R5 has three sets of normally open contacts 81, 82, and 83, and two sets of normally closed contacts 84 and 85. Relay R6 has one set of normally closed contacts 86. Relay R7 has two sets of normally open contacts 87 and 88.

In accordance with the conventional usages and terminology of electrical control practice, it is understood that upon energization of the operating solenoid of any relay the "normally open" contacts are caused to complete electrical circuits and the "normally closed" contacts to interrupt electrical circuits.

A manually actuated momentary-contact pushbutton switch 90 serves as a means for initiating the normal cycle of operations, as will hereinafter be fully set forth.

Electrical connections between the various relays and other electrical controlling and responsive devices and a source of electrical supply 91 are provided by conductors arranged as diagrammatically shown in Fig. 1 and designated as follows: Line conductors L1 and L2 are connected to the source of supply 91, and conductor L1 leads directly through the normally closed contacts of relay R6 to a conductor V, this and conductor L2 forming buses across which the several circuits of the system may be said to be connected. Conductor V is connected to other elements of the system at the following points: one contact of pressure switch 38, of contact 48 of timer C1, of contact 56 of timer C2, and of contact 70, one side of each contact of relays R2, R3 and R4 (excepting 80), of contacts 81, 82, 83, and 84, and one side of the operating solenoid of relay R7. Conductor L2 is directly connected to the elements of the system at the following points: to one side of the motor winding of each of the three timers C1, C2, and C3, to one side of the operating solenoids of each of the relays R1, R2, R3, R5, and R6, of contacts 85 and 88, and to one side of the operating winding of the solenoid-actuated valve 44. The line conductor L2 is connected also to one side of the momentary contact switch 90 and to the common return terminal of the two-speed motor 13. Other interconnections are as follows, it being understood that the term "free" terminal or contact refers to that one of an associated pair of terminals or contacts which has not previously been recited as having a conductor connected thereto.

A conductor A forms a connection between the free terminals of contact 82 and the operating coil of solenoid valve 44, and also to the common terminal of double-throw contactor 64. Between the lower contact of contactor 64 and the high-speed terminal of agitator motor 13, connection is provided by a conductor B; and a conductor C similarly provides connection between the upper contacts of contactor 64 and the low-speed terminal of said motor. Conductor C is connected also to one side of contacts 57 of timer C2, the free side of which is connected through conductor D to one side of contact 87, the free side of which, in turn, is connected through conductor E to one side of normally closed contacts 80. From the free contact of pressure switch 38 conductor F provides connection to one side of contact 71 and also to the free terminal of the operating coil of relay R1. The free side of contact 71 is connected through conductor G to the free side of contact 74. The free sides of contacts 70 and 73 are both connected to a conductor H, and thereby to the free terminal of the motor winding of timber C2. The free terminal of momentary contact switch 90 is connected by a conductor I to the free terminals of the operating coils of solenoid valve 43 and relay R7 and also to the free end of contact 88. A conductor J provides connection between the free terminals of the operating coil of relay R2 and the contact 56. A conductor K connects the free terminals of contacts 72 and 75 and of the operating coil of relay R3 and one terminal of solenoid valve 45. The free terminal of contact 77 is connected to that of the operating coil of solenoid valve 43 by a conductor L.

A conductor M provides connection between the free terminal of contacts 76 and one side of pressure switch 40, thence by a conductor N to the free terminal of contact 79 and to one side of the operating coil of relay R4, the free terminal of said coil, as well as that of solenoid valve 45, being connected by a conductor O to that of contact 85. The free sides of contacts 78 and 81 and of the motor winding of timer C1 are interconnected by means of a conductor P. The free terminals of contacts 83 and 48 and the operating coil of relay R5 are interconnected by a conductor Q, which is also connected to one side of the lower contacts of switch 65 and to one side of pressure switch 39, the free side of the latter being connected by a conductor R to the free terminal of the operating coil of relay R6. The upper contact of switch 65 is connected through a conductor S to the free terminals of contacts 84 and 80; and the common terminal of switch 65 is connected through a conductor T to the free terminal of the motor winding of timer C3.

In Fig. 1 the apparatus is shown in its normal position of rest, all relays being deenergized, the timer C1 resting with switch contacts 48 open, the timer C2 resting with the cam follower 55 on the peripheral portion 53 of the cam, whereby contacts 56 are held open and contacts 57 closed, and timer C3 with the cam follower 63 on the peripheral portion 60 of the cam, whereby the lower contacts of both switches 64 and 65 are closed. The solenoid valves 38, 39 and 40 being deenergized, no air will be admitted from the regulators 33, 34 and 35 to the diaphragm valves 14 and 15, so that these will remain closed irrespective of air pressures on the outlet conduits of the regulators. Under normal starting temperature conditions the several regulators will be applying maximum control pressure in their respective outlet lines, so that the pressure switches will be maintained in their open circuit positions.

*Operation*

Assuming the tank to be filled with a batch of milk to be treated, the normal cycle of operation is initiated by the operator momentarily depressing the switch 90, which for the time connects the conductor I to the line conductor L2, thereby completing the circuits of the several elements involved in the initial stages of the operating cycle. A circuit is completed between the line wires L1 and L2 through the contacts of relay R6, conductor V, contacts 77, conductor L, the solenoid of valve 43 and conductor I, energizing said solenoid valve and admitting air from the regulator 33 to the upper chamber of the diaphragm valve 14, causing said valve to open to its full extent and admit heating medium to the coil 11, tending to bring the milk in the tank up to the first temperature value required in the cycle of treatment.

At the same time a circuit from conductor V through the operating coil of relay R7 and conductor I will energize said relay, closing both its normally-open contacts. Contact 89 provides a connection between conductors L2 and I, paralleling switch 90, which may be released without further effect. Contact 87 completes a circuit from conductor V through normally-closed contacts 84, conductor S, normally-closed contact 80, conductors E and D, contact 57 of timer C2 and conductor C to the low-speed winding of motor 13, causing the agitator 12 to operate at the lower of its two speeds.

This condition continues until the temperature of the milk in the tank reaches the predetermined control point of, say, 190° F., when the vane-and-orifice structure within the regulator, acting under the influence of the Bourdon spring, will begin to build up a back pressure in the pilot valve bellows, tending to close said valve and place the diaphragm valve 14 under a floating control so as to maintain the regulated temperature at its predetermined setting. The lowering of control pressure in the outlet conduit of the regulator 33 permits the pressure switch 38 to close its contact and provide a connection between conductors V and F, thus energizing relay R1, which closes its normally open contacts 70 and 71, the latter completing a circuit from conductor F through conductor G and the normally-closed contact 74 to conductor V, whereby relay R1 will remain energized without respect to further action of pressure switch 38. Contact 70 provides a connection between conductors V and H to the motor winding of timer C2, whereby the latter is placed in operation, immediately causing the follower to rise to the peripheral portion 54 of the cam, engaging member 58 and causing contacts 57 to be opened, thus interrupting the low-speed circuit of motor 13 and bringing the agitator 12 to rest.

Conditions now remain unchanged, with the temperature being regulated to a value of 190° F. for a time interval of approximately 30 minutes, as determined by the extent of the peripheral portion 54 of the cam 51 in the timer C2, until the cam reaches a position where the follower drops to the portion 52 of minimum radius, causing both contacts 56 and 57 to be closed. The closing of the latter serves through conductor C to energize the motor 13 and operate the agitator at its lower speed. The closing of contact 56 provides a connection between conductors V and J, thereby energizing relay R2, opening its normally closed contact 74 and closing its contacts 72 and 73. The opening of 74 deenergizes the relay R1, opening both its contacts 70 and 71, the latter interrupting connection between conductors F and G and the former between V and H, this circuit, however, being alternatively completed through contacts 73, so that the timer C2 continues to operate until the follower rises to the portion 53 of the cam, opening contacts 56, releasing relay R2, opening contacts 73 and bringing timer C2 to rest in its starting position. Contact 72, before being opened provides connection between conductors V and K, serving to energize the operating coils of relay R3 and solenoid valve 45. Contact 75, by paralleling contact 72, provides a locking circuit for relay R3, which thus remains energized upon deenergization of relay R2. Contact 76 provides connection between conductors V and M, but does not at the moment complete any circuit. Contact 77 upon opening serves to deenergize solenoid valve 43, whereupon diaphragm motor valve 14 closes. Meanwhile, in response to increased pressure in the outlet conduit of controller 33 due to its action in response to cooling of the batch, the pressure switch 38 definitely opens its contact.

Energization of the operating coil of solenoid valve 45 serves to admit air from the regulator 35 to the lower chambers of valves 14 and 15 rendering them active and tending to reduce the temperature of the batch under treatment to the predetermined value of, say, 70° F., as established by the setting of the controller.

In a manner identical with that hereinabove set forth in connection with the performance of regulator 33, the regulator 35, upon attainment of the control point, acts to close the contacts of pressure switch 40, thus providing a connection between conductors M and N, thereby completing a circuit including contacts 76, the conductors M and N, the operating coil of relay R4, conductor O and normally-closed contact 85 to conductor L2, thereby energizing relay R4, closing its contacts 78 and 79 and opening contacts 80. Contacts 78 provide a connection between conductors V and P, thus energizing the motor winding of 15-hour timer C1, which immediately begins to measure off a time interval of from 8 to 14 hours, as determined by the adjusted setting of arm 49 in relation to the graduated cam 46. Contacts 79, by providing a direct connection between conductors N and V, serve to lock relay R4 in its energized position. The opening of contacts 80 serves to interrupt the low-speed circuit of motor 13 and bring the agitator 12 to rest.

With the regulator 35 active, automatically admitting heating or cooling agent as necessary to maintain the temperature of the batch at the predetermined setting, operation will now continue without interruption throughout the interval established by the timer C1—that is to say, until the arm 49 engages the follower 47, causing contacts 48 to be momentarily closed, completing a circuit through conductor Q to the operating coil of relay R5, which becomes energized and acts to close contacts 81, 82 and 83, and to open contacts 84 and 85.

The closing of contacts 81 provides for the motor winding of timer C1 an alternative circuit in parallel with the contacts 78, which contacts at this time open due to release of relay R4 by the opening of contacts 85. The closing of contacts 82 provides a connection between conductors V and A, thereby energizing solenoid valve 39 and placing regulator 34 in operative communication with valve 15 to open the same and admit a cooling agent to lower the temperature of the batch to the final value of 45° F. Conductor A, being connected through the lower contacts of double-throw switch 64 to conductor B, provides a circuit for the high-speed winding of motor 13 and causes the agitator to be operated at the higher of its two possible velocities. The closing of contact 83 serves to connect conductors V and Q, and, through the lower contacts of switch 65, conductor T, thus energizing the motor winding of timer C3 and starting the cam 59 in operation with the follower 63 resting on the portion 60 of minimum radius. Contact 84 disconnects conductor S from conductor V. Contact 85, upon opening, serves to deenergize relay R4; but contacts 78 being bridged by contacts 81, the motor circuit of timer C1 is not opened, and this timer continues to operate even after its cam follower 47 is released and contacts 48 opened. Contacts 79 at their time of opening are carrying no current. The opening of contact 85 will also deenergize the solenoid valve 45, allowing it to close and rendering the controller 35 inoperative. Conductor S being cleared from conductor V by contacts 84, the closing of contacts 80 will not at this time produce any effect.

This condition will continue for a time approximating 30 seconds, until the follower 63 is engaged by the peripheral portion 61 of intermediate radius on cam 59 of timer C3, when the lower contact of switch 64 will be opened and the upper contact closed, transferring energization from the high-speed to the low-speed winding of motor 13 and reducing the velocity of agitation accordingly.

The timer C3 continues to run for a short time with the follower on portion 61 of the cam, after which said follower is engaged by the portion 62 of maximum radius, serving to open the lower contacts and to close the upper contacts of switch 65, transferring the connection of conductor T from conductor Q to conductor S, thus deenergizing the motor winding of timer C3 and bringing the cam 59 to rest, where it stands until conductor S is again energized.

Meanwhile the cooling agent admitted through the valve 15 continues to lower the temperature of the batch until it reaches a value of 45° F. for which regulator 34 has been set, at which time, in accordance with the principles hereinabove set forth in the operation of the regulators, there takes place a reduction of pressure in the regulator outlet conduit allowing the pressure switch 39 to close its contacts, energizing relay R6, opening its normally closed contacts, disconnecting the bus V from line conductor L1 and thereby deenergizing all the relays in the system, including R6, which immediately recloses its contacts, reconnecting conductors V and L. With all the relays deenergized, however, the only circuit completed is that from conductor V through contacts 84 to S, thence through the upper contacts of switch 65 to conductor T and the motor winding of timer C3 to conductor L2, so that the timer C3 resumes operation and continues to run until the cam follower drops to the portion 60 of the cam, opening the upper contacts of switch 65, clearing conductor T from conductor S, deenergizing the motor of the timer and bringing the cam to rest in its starting position. The timer C1, as hereinabove set forth, is for sake of simplicity shown as having but a single circuit, so that it comes to rest in whatever position it may be at the time of energization of relay R6, the practice being for the operator to reset it by hand to the starting position at the time of initiating the cycle.

While not so required for the purpose of this invention, yet, if desired, the necessity for manual resetting of the timer can be eliminated by utilizing the automatic resetting features of a timing instrument of the two-speed type, such as that set forth in U. S. Letters Patent No. 2,050,614, granted to W. J. Kerr August 11, 1936.

It is to be understood, of course, that while the system has been described herein in connection with the processing of milk, it is not to be specifically limited to this material, but is equally applicable to other food products of a liquid nature, as well as to the treatment or processing of liquids in various industries.

I claim:

1. In a system for controlling the processing of material at a plurality of temperature values maintained in a predetermined sequence and for predetermined time intervals: motor-driven timing mechanisms for establishing said time intervals, pneumatic regulating means for establishing said temperatures, and fluid-pressure-actuated control means to be actuated thereby, with fluid-pressure connections placing said regulating and control means in operative communication, together with fluid-pressure responsive means associated with said connections and operable upon the attainment of predetermined pressure conditions in said connections to render active said timing mechanisms.

2. In a system for controlling the processing of material at a plurality of temperature values maintained in a predetermined sequence and for predetermined time intervals: motor-driven timing mechanisms for establishing said time intervals, pneumatic regulating means for establishing said temperatures and fluid-pressure-actuated control means to be actuated thereby, with fluid-pressure connections placing said regulating and control means in operative communication, together with fluid-pressure responsive means associated with said connections and operable upon the attainment of predetermined pressure conditions in said connections to render active said timing mechanisms, and electrically operated valves in said connections, subject to said timing mechanisms for establishing and interrupting operative communication between said regulating and control means.

3. In a system for controlling the processing of material at a plurality of temperature values maintained in a predetermined sequence and for predetermined time intervals: motor-driven timing mechanisms for establishing said time vals, pneumatic regulating means for establishing said temperatures, and fluid-pressure-actuated actuated control means to be actuated thereby, together with fluid-pressure responsive means to render active said timing mechanisms, and agitating means jointly subject to said timing mechanisms and said pneumatic regulating means for operation during the periods of change from one temperature to another.

4. In a system for controlling the processing of material at a plurality of temperature values maintained in a predetermined sequence and for predetermined time intervals: motor-driven timing mechanisms for establishing said time intervals, pneumatic regulating means for establishing said temperatures, and fluid-pressure-actuated control means to be actuated thereby, together with fluid-pressure responsive means to render active said timing mechanisms, and agitating means jointly subject to said timing mechanisms and said pneumatic regulating means for operation during the periods of change from one temperature to another, said timing mechanisms embodying means whereby the agitating means may be operated at different degrees of intensity.

5. In a system for controlling the processing of material at a plurality of temperature values maintained in a predetermined sequence and for predetermined time intervals, and the agitation of said material: a plurality of motor-operated timing controllers for establishing said time intervals and electrical circuits for energizing the motors thereof, a plurality of temperature regulators for establishing said temperatures and operating through the medium of fluid pressure, a motor-driven agitating means and electrical circuits for energizing the motor thereof, means subject to certain of said timing controllers for rendering certain of said temperature regulators operative or inoperative, means subject to said fluid pressures for controlling said motor energizing circuits, and means jointly subject to said timing controllers and said regulators for controlling the circuits of the motor of said agitating means.

6. In a system for controlling the processing of material at a plurality of temperature values maintained in a predetermined sequence and for predetermined time intervals: a plurality of timing means for establishing said intervals, regulating means for establishing said temperatures, agitating means including a multi-speed electric motor for driving the same, means subject to joint control of said timing and regulating means for establishing agitation periods at one of said velocities, and means subject to one of said timing means for establishing agitation at another of said velocities.

7. In a system for controlling the processing of material at a plurality of temperature values maintained in a predetermined sequence and for predetermined time intervals: a first temperature regulating means for causing the temperature of said material to change and afterward to be maintained at a predetermined first value, a second temperature regulating means for causing said temperature to change to a predetermined second value, a third temperature regulating means for causing said temperature to change to a predetermined final value, a first timing device, a second timing device, an agitating means adapted to agitate said material, relay means associated with said first temperature regulating means and adapted to render said first timing device operative to determine the time of maintenance of said first temperature value, relay means associated with said second temperature regulating means and adapted to render said second timing device operative to determine the time of maintenance of said second temperature value, and means for rendering said agitating means active during times of said temperature changes.

8. In a system for controlling the processing of material at a plurality of temperature values maintained in a predetermined sequence and for predetermined time intervals: a first temperature regulating means for causing the temperature of said material to change and afterward to be maintained at a predetermined first value, a second temperature regulating means for causing said temperature to change to a predetermined second value, a third temperature regulating means for causing said temperature to change to a predetermined final value, a first timing device, a second timing device, an agitating means adapted to agitate said material at different intensities, relay means associated with said first temperature regulating means and adapted to render said first timing device operative to determine the time of maintenance of said first temperature value, relay means associated with said second temperature regulating means and adapted to render said second timing device operative to determine the time of maintenance of said second temperature value, means for rendering said agitating means active during times of said temperature changes, and further timing means for selecting the operation of said agitating means at the desired intensity.

9. In a system for controlling the processing of material at a plurality of temperature values maintained in a predetermined sequence and for predetermined time intervals: a first temperature regulating means for causing the temperature of said material to change and afterward to be maintained at a predetermined first value, a second temperature regulating means for causing said temperature to change to a predetermined second value, a third temperature regulating means for causing said temperature to change to a predetermined final value, a first timing device, a second timing device, an agitating means adapted to agitate said material at either of two intensities, relay means associated with said first temperature regulating means and adapted to render said first timing device operative to determine the time of maintenance of said first temperature value, relay means associated with said second temperature regulating means and adapted to render said second timing device operative to determine the time of maintenance of said second temperature value, means for rendering said agitating means active during times of said temperature changes, and a further timing device for selecting the operation of said agitating means at one or the other of the two intensities.

10. In a system for controlling the processing of material at a plurality of temperature values maintained in a predetermined sequence and for predetermined time intervals: a first temperature regulating means for causing the temperature of said material to change and afterward to be maintained at a predetermined first value, a second temperature regulating means for causing said temperature to change to a predetermined second value, a third temperature regulating means for causing said temperature to change to a predetermined final value, a first timing device, a second timing device, an agitating means adapted to agitate said material at either of two intensities, relay means associated with said first temperature regulating means and adapted to render said first timing device operative to determine the time of maintenance of said first temperature value, relay means associated with said second temperature regulating means and adapted to render said second timing device operative to determine the time of maintenance of said second temperature value, means for rendering said agitating means active during times of said temperature changes, and a further timing device subject to said second timing device for rendering active said agitating means at one of said intensities, and for subsequently rendering the same active at the other of said intensities.

RAYMOND S. BLODGETT.